(12) United States Patent  
Kamoshida et al.

(10) Patent No.: US 7,634,154 B2  
(45) Date of Patent: Dec. 15, 2009

(54) IMAGE CONVERSION APPARATUS AND IMAGE CONVERSION METHOD

(75) Inventors: Yukio Kamoshida, Hokkaido (JP); Takahiro Oshino, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 558 days.

(21) Appl. No.: 11/473,064

(22) Filed: Jun. 23, 2006

(65) Prior Publication Data

US 2007/0121126 A1      May 31, 2007

(30) Foreign Application Priority Data

Jun. 23, 2005  (JP) ............................. 2005-183737  
Jun. 22, 2006  (JP) ............................. 2006-173016

(51) Int. Cl.  
*G06K 9/36* (2006.01)

(52) U.S. Cl. ..................... 382/276; 382/293; 382/298; 382/300; 345/660; 348/561; 708/208

(58) Field of Classification Search ................. 382/276, 382/285, 293, 298, 300; 345/660; 348/561  
See application file for complete search history.

(56) References Cited

U.S. PATENT DOCUMENTS 6,289,136 B1      9/2001   Oshino et al.  
6,434,277 B1 *    8/2002   Yamada et al. ............... 382/285  
6,738,424 B1 *    5/2004   Allmen et al. .......... 375/240.08

FOREIGN PATENT DOCUMENTS

JP         61080971          4/1986

* cited by examiner

*Primary Examiner*—Tom Y Lu  
(74) *Attorney, Agent, or Firm*—Fitzpatrick, Cella, Harper & Scinto

(57) ABSTRACT

An image conversion apparatus for geometrically converting input image data and outputting output image data, includes an inverse coordinate conversion unit configured to inversely convert coordinate values on the coordinate system of the output image data into coordinate values on the coordinate system of the input image data based on the geometric conversion. When a region between neighboring pixels of the coordinate system of the input image data is divided into a plurality of divisions, the inverse coordinate conversion unit changes the inversely converted coordinate values so that coordinate values which belong to an identical division of the inversely converted coordinate values have a random two-dimensional array.

1 Claim, 3 Drawing Sheets

IMAGE CONVERSION APPARATUS AND IMAGE CONVERSION METHOD

FIELD OF THE INVENTION

The present invention relates to an image conversion apparatus and image conversion method.

BACKGROUND OF THE INVENTION

Conventionally, image geometric conversion is popularly utilized in resolution conversion such as enlargement, reduction, and the like of images, distortion correction of a lens, special video effects, texture mapping of CG and the like, and so forth. The image geometric conversion is to convert an original image into an arbitrary shape. A conventional image conversion apparatus implements the image geometric conversion by mapping the coordinate values of an input image corresponding to pixels of an output image upon converting an image from the input image to the output image.

Image data input from a digital camera, personal computer, or the like is band-limited by filter processing so as to remove aliasing in a pre-filter processor, and the processing result is stored in an image data storage memory.

An inverse coordinate arithmetic unit maps the coordinates of an output image to those of an input image based on desired geometric conversion. A conversion control circuit generates the coordinates (lattice points) of pixels of the output image based on an external control signal. An inverse coordinate conversion circuit inversely converts the coordinates of the output image output from the conversion control circuit into corresponding coordinate values of the input image. The inverse conversion of the coordinates from the output image into the input image is implemented by looking up a coordinate conversion table, making arithmetic operations based on various geometric conversion methods, or by their combinations. The inverse coordinate conversion circuit outputs the coordinates (lattice points) of a plurality of pixels near an inversely converted coordinate value on the input image to the image data storage memory. The image data storage memory outputs a plurality of image data of designated coordinates of the input image data that has undergone the band-limiting processing to an interpolation filter processing circuit. Also, the inverse coordinate conversion circuit supplies distances between the inversely converted coordinate value and the coordinates (lattice points) of neighboring pixels to an interpolation filter coefficient generation circuit.

An interpolation filter processor calculates the pixel values of the output image from those of the input image by interpolation. The interpolation filter processing circuit executes interpolation filter processing by multiply and accumulation operation of a plurality of pixel values output from the image data storage memory and interpolation filter coefficients output from the interpolation filter coefficient generation circuit, and outputs the processing result as a geometrically converted image.

As in the aforementioned image conversion apparatus, in the image geometric conversion, the pixels of the output image must correspond to those of the input image by the inverse conversion of the desired geometric conversion. However, the pixel positions (lattice points) of the output image do not always correspond to those of the input image, and the pixel values of the output image must be calculated from those of the input image near the inversely converted coordinate value by interpolation.

In general, the interpolation filter processing is implemented by the multiply and accumulation operation as in the aforementioned interpolation filter processing circuit, and can be written as:

$$G(X, Y) = \sum_i \sum_j g(x_i, y_j) \cdot h(x - x_i) \cdot h(y - y_j) \quad (1)$$

where $G(X, Y)$ is the pixel value of the output image, and $g(x_i, y_j)$ is that of the input image. $(X, Y)$ is the pixel coordinate value (lattice point) of the output pixel, $(x, y)$ is the inversely converted coordinate value on the input image corresponding to the pixel value $(X, Y)$ of the output image, and $(x_i, y_j)$ is the pixel coordinate value (lattice point) near the inversely converted coordinate value. $h(x-x_i)$ and $h(y-y_j)$ are filter coefficients in the x- and y-directions. $(x-x_i)$ and $(y-y_j)$ are distances between the inversely converted coordinate values and neighboring pixel coordinate value (lattice point). As the interpolation method, bilinear interpolation, bicubic interpolation, and the like are known.

As can be seen from equation (1), the pixel value of the output image depends on the pixel values of the input image near the inversely converted coordinate value and the filter coefficients having as variables the distances between the inversely converted coordinate value and neighboring pixel coordinate value (lattice point), and the pixel value on the output image changes in accordance with the distances between the inversely converted coordinate value and neighboring pixel coordinate value, and the filter coefficients used even when image patterns of the input image near the inversely converted coordinate value are equal to each other. This causes generation of a pattern called moiré which does not exist in the input image upon converting an image which uniformly includes periodic patterns with high contrast. Since the moiré shape has the same pattern as a two-dimensional array of positions where filters having identical filter coefficients are used based on the distances between the inversely converted coordinate value and neighboring pixel coordinate values, a pattern which is different from the contents of the input image appears in the output image, thus generating a visually unnatural image.

As described above, in the conventional image geometric conversion, moiré is readily generated depending on the arithmetic contents of the interpolation processing. Conventionally, in order to reduce moiré generated by image processing, low-pass filter processing is executed after the image processing to smooth an image, thus reducing the moiré (see Japanese Patent Laid-Open No. 61-80971). However, the resolution drop incurs as a result of the low-pass filter processing.

SUMMARY OF THE INVENTION

The present invention has been made in consideration of the aforementioned problems, and has as its object to perform geometric conversion in which generation of moiré is suppressed without causing any image resolution drop.

The first aspect of the present invention relates to an image conversion apparatus for geometrically converting input image data and outputting output image data, comprising: an inverse coordinate conversion unit configured to inversely convert coordinate values on a coordinate system of the output image data into coordinate values on a coordinate system of the input image data based on the geometric conversion, wherein when a region between neighboring pixels of the coordinate system of the input image data is divided into a plurality of divisions, the inverse coordinate conversion unit changes the inversely converted coordinate values so that coordinate values which belong to an identical division of the inversely converted coordinate values have a random two-dimensional array.

The second aspect of the present invention relates to an image conversion method of geometrically converting input image data and outputting output image data, comprising: an image conversion step of generating output image data by geometrically converting input image data; and an inverse coordinate conversion step of inversely converting coordinate values on a coordinate system of the output image data into coordinate values on a coordinate system of the input image data based on the geometric conversion, wherein the inverse coordinate conversion step includes a step of changing, when a region between neighboring pixels of the coordinate system of the input image data is divided into a plurality of divisions, the inversely converted coordinate values so that coordinate values which belong to an identical division of the inversely converted coordinate values have a random two-dimensional array.

The third aspect of the present invention relates to a program for making a computer implement the image conversion apparatus.

The fourth aspect of the present invention relates to a computer-readable storage medium storing the program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described hereinafter with reference to the accompanying drawings.

First Embodiment

Figure 1:
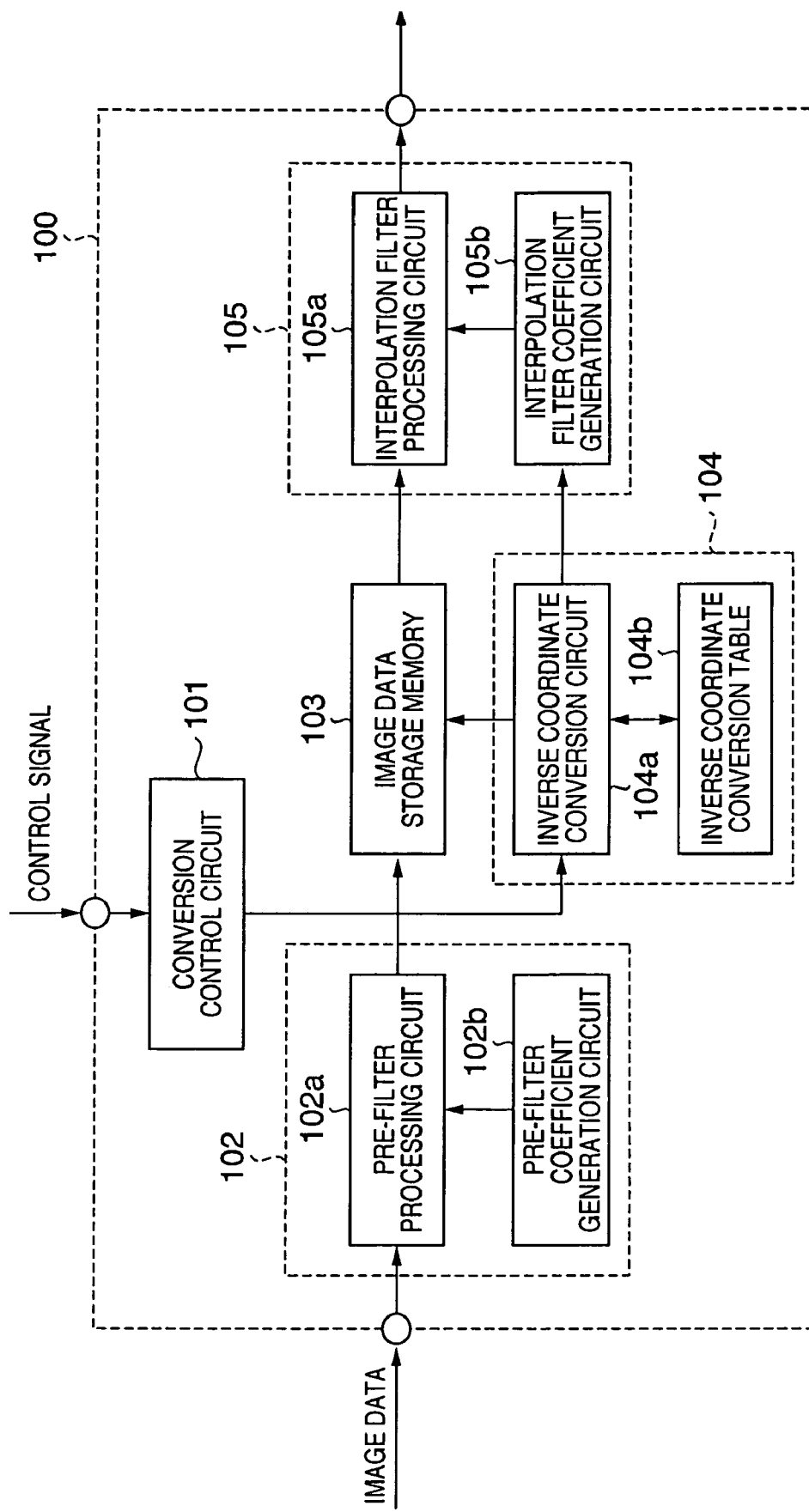
FIG. 1 is a block diagram showing the arrangement of an image conversion apparatus according to the preferred first embodiment of the present invention.

FIG. 1 is a block diagram showing the arrangement of an image conversion apparatus 100 according to the preferred first embodiment of the present invention. The image conversion apparatus 100 according to this embodiment comprises, e.g., a conversion control circuit 101, a pre-filter processor 102, an image data storage memory 103, an inverse coordinate conversion arithmetic unit 104 as an inverse coordinate converter, and an interpolation filter processor 105. The inverse coordinate conversion arithmetic unit 104 calculates inversely converted coordinate values so that values equal to or smaller than the pixel distance of inversely converted coordinate values, which are obtained by inversely converting the coordinates of an output image onto an input image based on desired geometric conversion, are randomly arrayed on the output image.

Image data input to the image conversion apparatus 100 is input to a pre-filter processing circuit 102a, and is band-limited using filter processing by multiply and accumulation operation with coefficients output from a pre-filter coefficient generation circuit 102b. This processing is executed to prevent aliasing generated when the sampling interval becomes coarse in case of, e.g., image reduction. The pre-filter coefficient generation circuit 102b generates filter coefficients according to a reduction ratio so as to perform band-limiting processing according to the reduction ratio of the entire or partial image, and outputs them to the pre-filter processing circuit 102a. The input image band-limited by the pre-filter processing circuit 102a is stored in the image data storage memory 103.

An inverse coordinate conversion circuit 104a reads out inversely converted coordinate values on the input image corresponding to the coordinates of the output image supplied from the conversion control circuit 101 with reference to an inverse coordinate conversion table 104b. The inverse coordinate conversion table 104b stores mapping data (inversely converted coordinate values corresponding to the output coordinates), and outputs inversely converted coordinate values on the input image based on the supplied coordinates of the output image.

This mapping data is changed so that values (when the pixel distance is 1, the value of the decimal part of each inversely converted coordinate value) equal to or smaller than pixel distances of inversely converted coordinate values corresponding to mapping data of the inverse conversion of the original desired geometric conversion are two-dimensionally and randomly arrayed. Especially, the mapping data is changed to refer to inversely converted coordinate values corresponding to the coordinates of the output image, so that when pixels of the output image are divided in association with numerical values equal to or smaller than the pixel distances of the inversely converted coordinate values, the frequency characteristics of the two-dimensional array of pixels that belong to an identical division become characteristics (so-called blue noise characteristics) which include a large number of spectra and in which low-frequency spectra are suppressed. That is, inverse conversion is executed by changing the mapping data as needed so as to suppress low-frequency spectra.

The first embodiment and the second and third embodiments describe that changing the values equal to or smaller than the pixel distances of the inversely converted coordinate values to a two-dimensional, random array is equivalent to changing the frequency characteristics to the blue noise characteristics. However, the values equal to or smaller than the pixel distances of the inversely converted coordinate values may be simply changed to a two-dimensional, random array using a random number table or the like. In this case, whether or not the frequency characteristics become the blue noise characteristics is confirmed, and when the blue noise characteristics are not set, the above steps must be repeated.

Note that the "frequency characteristics are changed to the blue noise characteristics" in this case. However, when the mapping data is changed to at least approach the blue noise characteristics, the effects of the present invention can be obtained.

A method of generating the coordinate conversion table will be described below. When the pixel distance is 1, the numerical value of the decimal part of the inversely converted coordinate value is divided into a plurality of divisional values. In this embodiment, when a region between neighboring pixels on the coordinate system of the input image data is divided into a plurality of divisions, the inversely converted coordinate values of the output image are changed to obtain a random two-dimensional array of coordinate values, which belong to an identical division of the inversely converted coordinate values of the output image. For example, let $x_{int}$ and $y_{int}$ be the integer parts (numerical values below the decimal point are ignored) of the inversely converted coordinate values x and y, and $x_{dec}=x-x_{int}$ and $y_{dec}=y-Y_{int}$ be their decimal parts. Then, the decimal parts $x_{dec}$ and $y_{dec}$ of the inversely converted coordinate values are divided in 0.1-intervals like 0.9, 0.8, . . . , 0.2, and 0.1. Next, the frequency characteristics of a two-dimensional array of pixels of the output image, the coordinate values of which belong to each of divisional values, are calculated, and the decimal parts of the inversely converted coordinate values are corrected to have random frequency characteristics in which a low-frequency range is suppressed, i.e., so-called blue noise characteristics. In this embodiment, the decimal parts $x_{dec}$ and $y_{dec}$ of the inversely converted coordinate values are divided in 0.1-intervals. However, the present invention is not limited to this, and various other division methods may be used.

In this embodiment, the frequency of occurrence of pixels which belong to each division is calculated. Attention is focused first on a section which has a highest frequency of occurrence, the frequency characteristics of an array of pixels which belong to that division are evaluated, and pixels in an array, which have blue noise characteristics as their frequency characteristics, are extracted from those in that division. The decimal parts of the inversely converted coordinate values of the extracted pixels are not changed, and the numerical value of the interval of the divisional value (0.1 in this embodiment) is randomly added/subtracted to/from the decimal parts of pixels which are not required to realize the blue noise characteristics. Next, the frequency characteristics of pixels which belong to a division having a second highest frequency of occurrence are evaluated. Again, the decimal parts of the inversely converted coordinate values of the pixels which realize the blue noise characteristics are not changed, and the numerical value of the interval of the divisional value is added/subtracted to/from the decimal parts of pixels which are not required to attain the blue noise characteristics. This step is repeated for respective divisions in descending order of frequency of occurrence of pixels, and the inversely converted coordinate values are corrected for all the divisions so that an array of pixels which belong to each division have blue noise characteristics in that division. By correcting the decimal parts, carry-up and carry-down to the integer parts occur, and they are reflected in the integer parts of the inversely converted coordinate values. In consideration of shape errors of geometric conversion by correcting the inversely converted coordinate values, the numerical value range of correction may be set. In the above correction, even when all divisions are corrected, since the two-dimensional arrays of the respective divisional values do not always have blue noise characteristics, the inversely converted coordinate values are desirably corrected to approach the blue noise characteristics by repeating a series of steps a plurality of times.

The inverse coordinate conversion circuit 104a supplies the coordinate values of pixels near each inversely converted coordinate value supplied from the inverse coordinate conversion table 104b to the image data storage memory 103. The image data storage memory 103 outputs image data of a plurality of pixels near the inversely converted coordinate value based on the supplied values to an interpolation filter processing circuit 105a. When pixel values are to be interpolated by a linear interpolation method, the pixel values of four (=2×2) pixels (i.e., four pixels with coordinates ($x_{int}$, $y_{int}$), ($x_{int}$+1, $y_{int}$), ($x_{int}$, $y_{int}$+1), ($x_{int}$+1, $y_{int}$+1)) are output from the image data storage memory 103. The inverse coordinate conversion circuit 104a supplies distances between the inversely converted coordinate value and the coordinates of neighboring pixels to an interpolation filter coefficient generation circuit 105b.

The interpolation filter coefficient generation circuit 105b generates filter coefficients for image data of a plurality of neighboring pixels used in interpolation based on the distances between the inversely converted coordinate value and the coordinate values of the neighboring pixels supplied from the inverse coordinate conversion circuit 104a, and outputs them to the interpolation filter processing circuit 15a. As the interpolation method, the bilinear interpolation method, bicubic interpolation method, or the like is used. The interpolation filter processing circuit 105a performs interpolation by the multiply and accumulation operation of the plurality of image data supplied from the image data storage memory 103 and the filter coefficients supplied from the interpolation filter coefficient generation circuit 105b. The interpolated image data are output as geometrically converted image data.

In this embodiment, since the numerical values of the decimal parts of the inversely converted coordinate values of respective pixels of the output image are corrected to be two-dimensionally and randomly arrayed, moiré produced by the interpolation filter processing becomes a random pattern and hard to visually recognize. Furthermore, since the array of pixels which belong to respective numerical value ranges of the decimal parts of the inversely converted coordinate values are corrected to have frequency characteristics in which low-frequency spectra are suppressed, nearly no visually unnatural pattern is formed. Since smoothing filter processing need not be performed to suppress moiré unlike in the conventional apparatus, the resolution can be prevented from being sacrificed. Since the inversely converted coordinate values of desired geometric conversion are corrected, conversion errors may occur. However, since the correction amounts of the inversely converted coordinate values fall within the range of the pixel distance or less, conversion errors of geometric conversion are small. In the preferred embodiment of the present invention, since mapping data of the inverse coordinate conversion table need only be changed, moiré suppression can be implemented by a simple apparatus arrangement.

Second Embodiment

Figure 2:
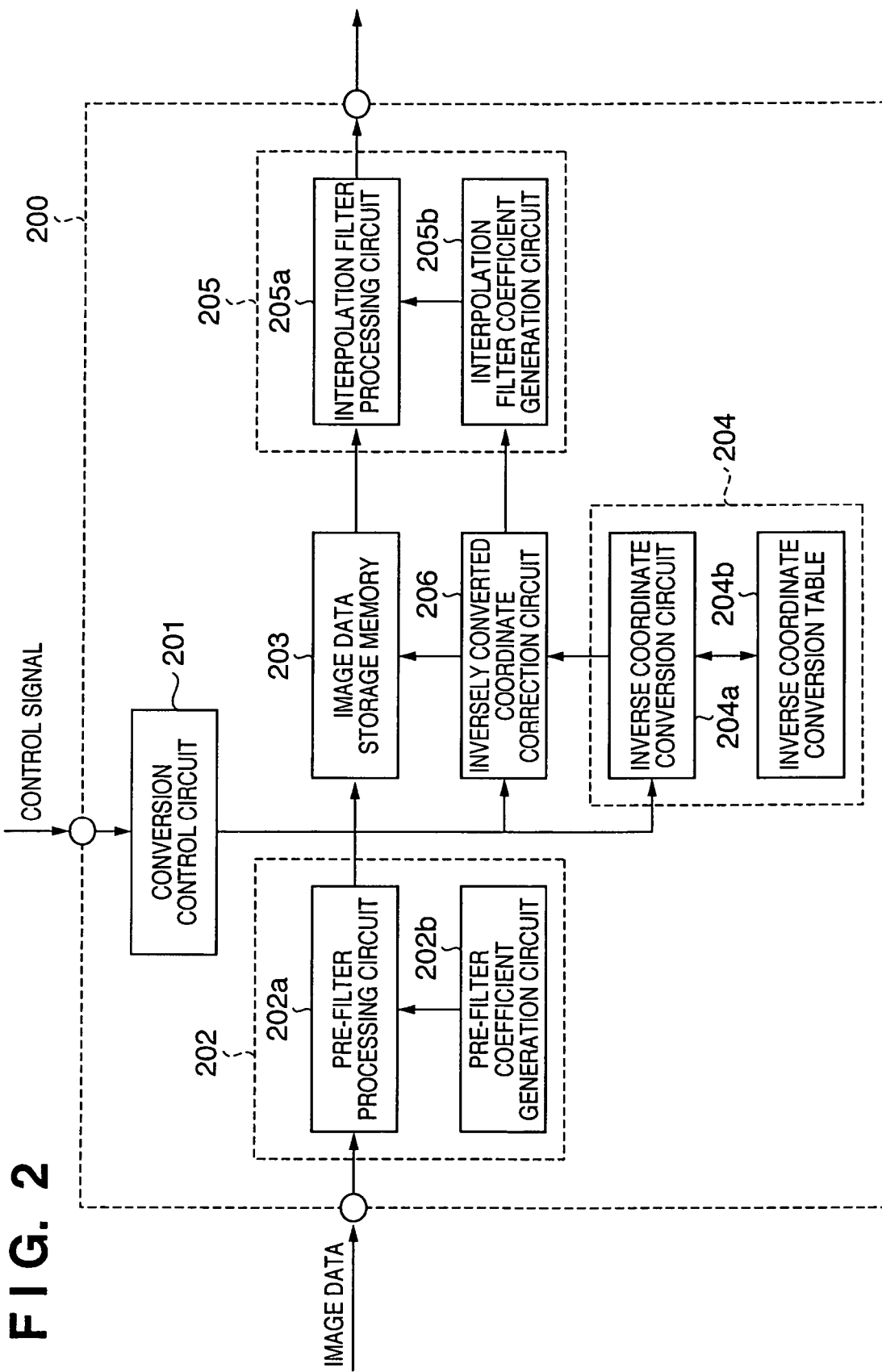
FIG. 2 is a block diagram showing the arrangement of an image conversion apparatus according to the preferred second embodiment of the present invention.

FIG. 2 is a block diagram showing the arrangement of an image conversion apparatus 200 according to the preferred second embodiment of the present invention. The image conversion apparatus 200 according to this embodiment comprises, e.g., a conversion control circuit 201, a pre-filter processor 202, an image data storage memory 203, an inverse coordinate conversion arithmetic unit 204 as an inverse coordinate converter, and an interpolation filter processor 205.

In the preferred embodiment of the present invention, an inversely converted coordinate value correction circuit 206 as an inverse coordinate converter corrects inversely converted coordinate values for desired arbitrary geometric conversion using a matrix in which respective numerical values within the range of the pixel distance or less are arrayed at random.

Image data input to the image conversion apparatus 200 is band-limited by a pre-filter processing circuit 202a by performing filter processing using multiply and accumulation operation with coefficients output from a pre-filter coefficient generation circuit 202b. The band-limited input image data is stored in the image data storage memory 203.

An inverse coordinate conversion circuit 204a calculates inversely converted coordinate values on the input image corresponding to the coordinates of an output image supplied from the conversion control circuit 201 with reference to an inverse coordinate conversion table 204b. The calculated inversely converted coordinate values are output to the inversely converted coordinate value correction circuit 206. The inverse coordinate conversion table 204b stores mapping data of inversely converted coordinate values on the input image corresponding to pixels of the output image. In this embodiment, only the mapping data including coarse lattice points used to divide the output image is stored, and the inverse coordinate conversion circuit 204a calculates inversely converted coordinate values for pixels within lattice points by arithmetic operations based on those at the lattice points read out with reference to the inverse coordinate conversion table 204b.

The inversely converted coordinate value correction circuit 206 corrects the inversely converted coordinate values input from the inverse coordinate conversion circuit 204a using the matrix in which numerical values equal to or smaller than the pixel distance are arrayed. The matrix used to correct the inversely converted coordinate values has an arbitrary size, and numerical values are arrayed so that the frequency characteristics of a two-dimensional array of numerical values equal to or smaller than the pixel distance become blue noise characteristics. In this embodiment, the pixel distance is 1, 10 numerical values are set like −0.5, −0.4, . . . , 0.4, and 0.5, and these numerical values are arrayed to have blue noise characteristics. This matrix is repetitively used to be arranged in a tile pattern for the output image, and the inversely converted coordinate values are corrected by adding the inversely converted coordinate values of pixels of the output image and elements of the matrix. The coordinates of a plurality of pixels near each corrected inversely converted coordinate value are output to the image data storage memory 203, and distances between each corrected inversely converted coordinate value and the coordinate values of respective pixels near the corrected inversely converted coordinate value are output to an interpolation filter coefficient generation circuit 205b.

The image data storage memory 203 outputs stored image data of a plurality of pixels based on the input coordinates of pixels near each corrected inversely converted coordinate value to an interpolation filter processing circuit 205a.

The interpolation filter coefficient generation circuit 205b calculates coefficients of an interpolation filter based on the input distances between each corrected inversely converted coordinate value and the coordinate values of the neighboring pixels, and outputs them to the interpolation filter processing circuit 205a. The interpolation filter processing circuit 205a performs filter processing by multiply and accumulation operation of the input image data of neighboring pixels and the interpolation filter coefficients, thus interpolating image data.

The image data that has undergone the interpolation processing is output as output image data.

In this embodiment, by two-dimensionally and randomly correcting the inversely converted coordinate values, generation of moiré due to interpolation processing can be suppressed. Since correction is made using the matrix in which respective numerical values used to correct the inversely converted coordinate values are arrayed to have blue noise characteristics, a visually unnatural pattern can be reduced. Since the inversely converted coordinate values are corrected within the numerical value range of the pixel distance or less, geometric conversion errors are small.

In this embodiment, the inversely converted coordinate values are corrected using the matrix after the coordinates are inversely converted. Hence, this embodiment can be applied to a case wherein mapping data in which the inversely converted coordinate values are corrected cannot be prepared in advance or a case wherein coordinates are inversely converted by arithmetic operations, thus exhibiting effects in texture mapping, a moving image special effect, and the like.

Third Embodiment

In this embodiment, the arithmetic contents of filter coefficients calculated based on inversely converted coordinate values are two-dimensionally and randomly changed on an output image, thus suppressing moiré generated by interpolation processing.

Figure 3:
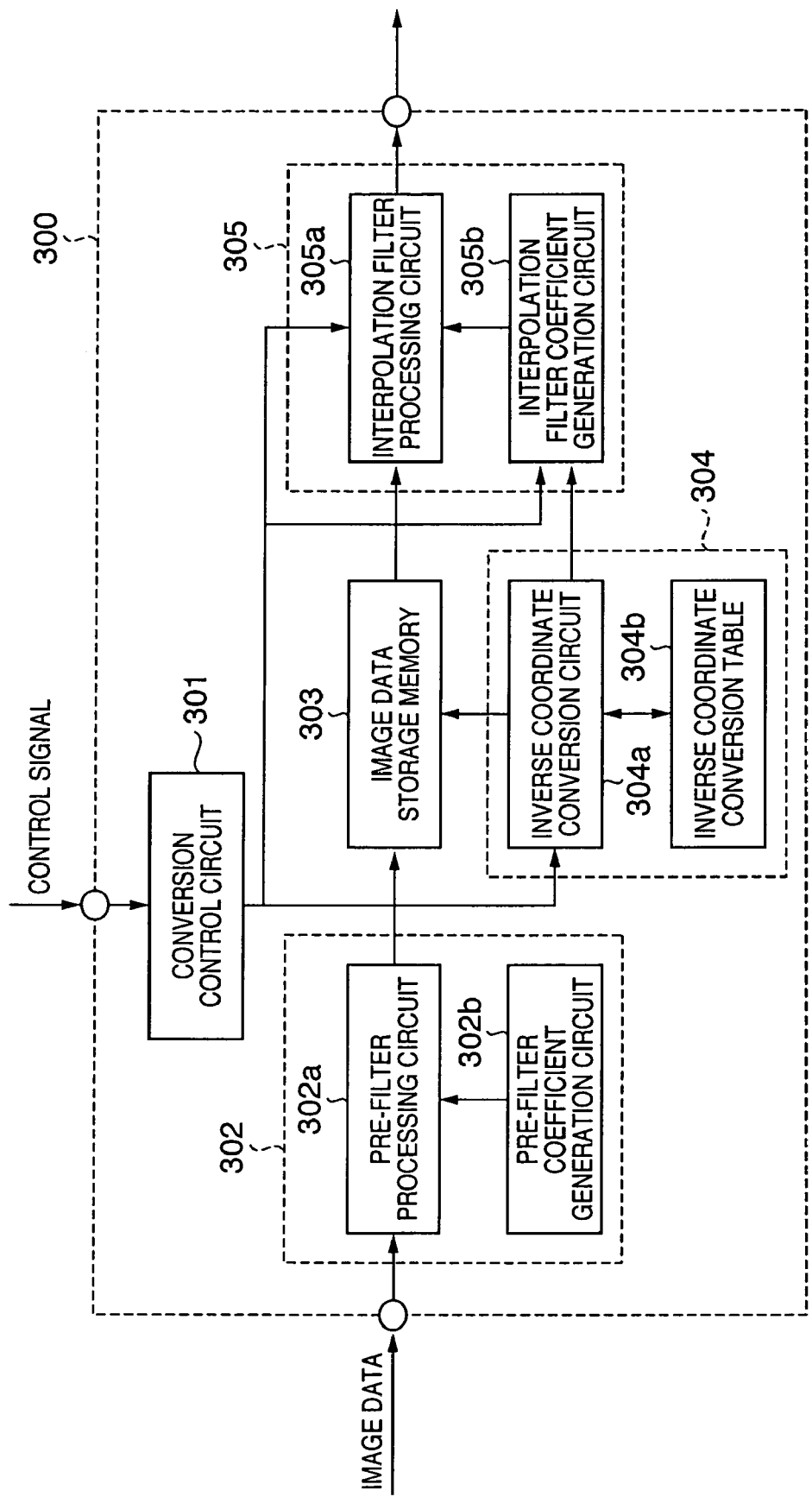
FIG. 3 is a block diagram showing the arrangement of an image conversion apparatus according to the preferred third embodiment of the present invention.

FIG. 3 is a block diagram showing the arrangement of an image conversion apparatus 300 according to the preferred third embodiment of the present invention. The image conversion apparatus 300 according to this embodiment comprises, e.g., a conversion control circuit 301, a pre-filter processor 302, an image data storage memory 303, an inverse coordinate conversion arithmetic unit 304 as an inverse coordinate converter, and an interpolation filter processor 305.

Image data input to the image conversion apparatus 300 is band-limited by a pre-filter processing circuit 302a by performing filter processing using multiply and accumulation operation with coefficients output from a pre-filter coefficient generation circuit 302b. The band-limited input image data is stored in the image data storage memory 303.

The inverse coordinate conversion arithmetic unit 304 outputs inversely converted coordinate values on the input image based on the coordinates of an output image supplied from the conversion control circuit 301. An inverse coordinate conversion table 304b stores inversely converted coordinate values corresponding to the output coordinates as mapping data. When the inversely converted coordinate values are input, an inverse coordinate conversion circuit 304a outputs the coordinates of a plurality of pixels near each inversely converted coordinate value to the image data storage memory 303, and the distances between each inversely converted coordinate value and the coordinate values of the plurality of pixels near that inversely converted coordinate value to an interpolation filter coefficient generation circuit 305b.

The interpolation filter coefficient generation circuit 305b calculates filter coefficients based on the distances between each inversely converted coordinate value and the coordinate values of the plurality of pixels near that inversely converted coordinate value, which are supplied from the inverse coordinate conversion circuit 304a. In this embodiment, two different interpolation methods, i.e., the bilinear interpolation method and bicubic interpolation method, are used in combination, and the arithmetic contents of filter coefficients are changed depending on the coordinates of the output image. In the bilinear interpolation method, interpolation is done using four points near each inversely converted coordinate value. A coefficient for each neighboring pixel is calculated by:

$$h_i(x-x_i) = 1 - |x-x_i| \quad (i=1,2) \tag{2}$$

where x is an inversely converted coordinate value, $x_i$ is a neighboring pixel coordinate, and $h_i$ is a filter coefficient. In the bicubic interpolation method, interpolation is done using 16 points near each inversely converted coordinate value. A coefficient for each neighboring pixel is calculated by:

$$h_c(cx - x_i) = \begin{cases} 1 - 2|x - x_i|^2 + |x - x_i|^3 & 0 \le |x - x_i| < 1 \\ 4 - 8|x - x_i| + 5|x - x_i|^2 - |x - x_i|^3 & 1 \le |x - x_i| < 2 \\ 0 & 2 \le |x - x_i| \end{cases} \quad (3)$$

$$(i = 1, 2, 3, 4)$$

Filter coefficients in the y-direction are also calculated by similar arithmetic operations. The arithmetic contents of the two different types of filter coefficients are changed depending on the coordinates of the output image. In this embodiment, the use positions of these arithmetic contents are randomly selected so that the frequency characteristics include many spectra, and low-frequency spectra are suppressed.

The conversion control circuit 301 controls to change the contents of the interpolation operations based on an external control signal. The use positions with reference to output images of respective arithmetic operations, i.e., bilinear interpolation and bicubic interpolation are controlled so that the frequency characteristics become blue noise characteristics which include many spectra and in which low-frequency spectra are suppressed. When the coordinates of the output image are to be output based on an external control signal using a matrix in which flags each expressing use of each interpolation are stored to have an array corresponding to blue noise characteristics, a signal for controlling the arithmetic contents in accordance with the flag of an element corresponding to each pixel upon overlying the matrix on each output image is output. The conversion control circuit 301 outputs information associated with the number of pixels required for interpolation together with the coordinates of the output image to the inverse coordinate conversion circuit 304a, outputs information associated with the number of filter taps to an interpolation filter processing circuit 305a, and outputs information associated with the arithmetic contents of filter coefficients to the interpolation filter coefficient generation circuit 305b. When the matrix has an arbitrary size, which is smaller than the output image, the matrix is repetitively used to be arranged in a tile pattern for the output image. With this control, the use positions of the contents of the respective interpolation operations can be controlled to have blue noise characteristics depending on the coordinates of the output image.

The inverse coordinate conversion circuit 304a calculates inversely converted coordinate values based on the information associated with the coordinates of the output image, and outputs the coordinates of neighboring pixels required for interpolation to the image data storage memory 303 based on the information associated with the number of pixels required for interpolation. Also, the inverse coordinate conversion circuit 304a calculates the distances between each inversely converted coordinate value and the coordinates of neighboring pixels, and outputs them to the interpolation filter coefficient generation circuit 305b. For a pixel using bilinear interpolation, the distances between the coordinates of four (=2×2) neighboring pixels and each inversely converted coordinate value are output. In bicubic interpolation, the distances between the coordinates of 16 (=4×4) neighboring pixels and each inversely converted coordinate value are output. The interpolation filter coefficient generation circuit 305b selects the arithmetic contents of the bilinear interpolation method and bicubic interpolation method based on the input information associated with the arithmetic contents of the filter coefficients, and calculates filter coefficients based on the distances between each inversely converted coordinate value and the coordinates of neighboring pixels. When bilinear interpolation is used, filter coefficients are calculated by arithmetic operations given by equation (2). When bicubic interpolation is used, filter coefficients are calculated by arithmetic operations given by equation (3). The calculated filter coefficients are output to an interpolation filter processing circuit 305a. The interpolation filter processing circuit 305a makes multiply and accumulation operation of image data of neighboring pixels output from the image data storage memory 303 and the filter coefficients output from the filter coefficient generation circuit 305b based on the information associated with the number of filter taps. The number of filter taps is four (=2×2) taps in case of bilinear interpolation, and is 16 (=4×4) taps in case of bicubic interpolation. The filter size can be changed by changing the number of taps, or by setting coefficients of taps which are not used to zero. Image data calculated by the multiply and accumulation operation is output from the interpolation filter processing circuit 305a as output image data.

In this embodiment, interpolation processing can be executed using different filters depending on the coordinates of the output image, and the contents of the interpolation filter operations are randomly changed depending on pixels of the output image so that the use positions of respective arithmetic contents have blue noise characteristics, preferably. In this way, as in the second embodiment, generation of visually unnatural moiré according to inverse conversion of desired geometric conversion due to interpolation processing can be suppressed.

In this embodiment, two different types of interpolation operations, i.e., bilinear interpolation and bicubic interpolation, are used. Alternatively, a larger number of interpolation operations may be used together, and the contents of the interpolation operations may be changed according to the coordinates of the output image so that the use positions of arithmetic operations are randomly selected, i.e., they preferably have blue noise characteristics. The same effect can be obtained by changing the frequency characteristics of an interpolation filter depending on the coordinates of the output image.

The preferred embodiments of the present invention can be applied to an arrangement in which a computer executes processing based on an instruction of a program code stored in a storage medium that records the program code of software which implements the functions of the aforementioned embodiments. In this case, the program code itself implements the functions of the aforementioned embodiments, and the program code itself and the storage medium which records it constitute the preferred embodiments of the present invention.

As many apparently widely different embodiments of the present invention can be made without departing from the spirit and scope thereof, it is to be understood that the invention is not limited to the specific embodiments thereof except as defined in the claims.

This application claims the benefit of Japanese Applications No. 2005-183737 filed on Jun. 23, 2005 and No. 2006-173016 filed on Jun. 22, 2006, which are hereby incorporated by reference herein in their entirety.

What is claimed is:

1. An image conversion apparatus for geometrically converting input image data and outputting output image data, comprising:

an inverse coordinate conversion unit configured to inversely convert coordinate values on a coordinate system of the output image data into coordinate values on a coordinate system of the input image data based on the geometric conversion, wherein said inverse coordinate conversion unit changes the inversely converted coordinate values so that frequency characteristics of a two dimensional away of coordinate values which belong to an identical division of the inversely converted coordinate values approach blue noise characteristics.

* * * * *